US011453268B2

(12) United States Patent
Meiselman

(10) Patent No.: US 11,453,268 B2
(45) Date of Patent: Sep. 27, 2022

(54) AIR CONDITIONER SYSTEM

(71) Applicant: Alyson D. Meiselman, Gaithersburg, MD (US)

(72) Inventor: Alyson D. Meiselman, Gaithersburg, MD (US)

(*) Notice: Subject to any disclaimer, the term of this patent is extended or adjusted under 35 U.S.C. 154(b) by 306 days.

(21) Appl. No.: 16/657,429

(22) Filed: Oct. 18, 2019

(65) Prior Publication Data
US 2020/0324622 A1 Oct. 15, 2020

Related U.S. Application Data

(60) Provisional application No. 62/834,034, filed on Apr. 15, 2019.

(51) Int. Cl.
*B60H 1/00* (2006.01)
*B60H 1/24* (2006.01)
*B60H 1/32* (2006.01)

(52) U.S. Cl.
CPC ......... *B60H 1/245* (2013.01); *B60H 1/00521* (2013.01); *B60H 1/246* (2013.01); *B60H 1/3229* (2013.01)

(58) Field of Classification Search
CPC .... B60H 1/245; B60H 1/00521; B60H 1/246; B60H 1/3229; B60H 1/00657; B60H 1/00571; B60H 1/00457; B60H 1/3227; B60H 1/3223; B60H 2001/00235; B60H 1/00207; B60H 1/00592
USPC ....................................................... 454/136
See application file for complete search history.

(56) References Cited

U.S. PATENT DOCUMENTS

| | | | |
|---|---|---|---|
| 2,749,725 A | | 6/1956 | Essman et al. |
| 2,883,835 A | | 4/1959 | Pikey |
| 3,595,029 A | | 7/1971 | Lende, Jr. |
| 3,717,010 A | * | 2/1973 | Slattery ................. F25B 49/027 62/184 |

(Continued)

FOREIGN PATENT DOCUMENTS

| | | | |
|---|---|---|---|
| CN | 103935225 A | | 7/2014 |
| IT | 201700131339 | * | 11/2017 ......... B60H 1/00364 |

OTHER PUBLICATIONS

DIYPAC, "R134a Portable Air Conditioner" Instructables, pp. 1-13, <https://www.instructables.com/id/Do-It-Yourself-Portable-Air-Chiller/> (Dec. 2015).

(Continued)

*Primary Examiner* — Avinash A Savani
*Assistant Examiner* — Ryan L Faulkner
(74) *Attorney, Agent, or Firm* — Browdy and Neimark, P.L.L.C.

(57) ABSTRACT

An air conditioning system includes an evaporator, compressor, condenser and an expansion system in a closed system to cycle refrigerant. The components are mounted in a housing with sidewalls, bottom wall and top wall in a vertically stacked configuration with a horizontally mounted frame approximately bisecting the housing. A fan below the frame dissipates heat into or through the bottom of a vehicle and a fan above the frame circulates cool air into a passenger compartment. The air conditioning system is powered by a 12-volt direct current, which is fused (15 amperes) running off the vehicle's battery or the alternator and is operated by an electronic control circuit.

15 Claims, 4 Drawing Sheets

(56) References Cited

U.S. PATENT DOCUMENTS

| | | | |
|---|---|---|---|
| 3,775,996 | A | 12/1973 | Blomberg |
| 6,116,037 | A | 9/2000 | Burnett |
| 8,056,351 | B2 | 11/2011 | Marciano et al. |
| 9,816,719 | B2 * | 11/2017 | Bergman ........... B60H 1/00657 |
| 2008/0307820 | A1 | 12/2008 | Ingram |
| 2015/0027160 | A1 | 1/2015 | Callahan |
| 2017/0203631 | A1 * | 7/2017 | Ryu .................... B60H 1/2225 |
| 2018/0147911 | A1 | 5/2018 | Woo et al. |

OTHER PUBLICATIONS

BLDCAC, "Micro DC Air Conditioner" pp. 1-10, <https://www.rigidhvac.com/blog/dc-air-condition>, (Oct. 2017).

60761956557,"Portable Car Air Conditioning System DC 12/24v Vertical Intelligent Electric Parking Cooler", Ningbo Bowente Auto Parts Co., Ltd., pp. 1-16 <https://www.alibaba.com/product-detail/Portable-Car-Air-Conditioning-System-DC_.html> (Mar. 2019).

32826851334, "R134a DC 12V miniature compressor unit for Dc Inverter Small Portable Air Conditioner" pp. 1-4, (Mar. 2019).

MGBACCAA, "The MGB RetroFit™ air conditioning system" Classic Auto Air, pp. 1-2 (Mar. 2019).

\* cited by examiner

AIR CONDITIONER SYSTEM

CROSS-REFERENCE TO RELATED APPLICATIONS

This utility patent application filed under 35 § 111 claims priority to provisional patent application 62/834,034 filed on Apr. 15, 2019, which is incorporated by reference herein in its entirety.

BACKGROUND OF THE INVENTION

Many vehicles, such as classic cars and/or antiques are not factory equipped with air conditioning and in many situations air conditioning is strongly desired. In smaller classic sports cars, available space under the hood and/or in the passenger compartment to retrofit the car with air conditioning can be severely limited or is undesirable due to reduction of engine horsepower.

Conventional air-conditioning units for vehicles incorporate a compressor that is usually driven from the engine of the vehicle. Many of these smaller sports cars operate with limited horsepower and an additional AC load on the motor can hinder performance.

Thus, there is a need for a compact, light-weight, and low powered air-conditioning unit that is not dependent on the engine of the vehicle to operate. This may include, but is not limited to, use in compact sports cars, small air craft, truck sleeper cabins and certain leisure/camper vehicles.

BRIEF SUMMARY OF THE INVENTION

In one general aspect, an air conditioning system includes a rectangular housing with top and bottom walls and vertical side walls bisected by a mid-frame, an evaporator and compressor mounted above the mid-frame and a condenser system and an expansion system mounted below the mid-frame. A refrigerant flows in a closed loop from the evaporator, to the compressor, to the condenser, to the expansion system and then back to the evaporator.

Embodiments may include one or more of the following features. For example, the expansion system may be a capillary tube. An evaporator fan may circulate air through the evaporator. A condenser fan may circulate air through the condenser.

A first control board can be used to power to the compressor, regulate the temperature inputs, cycle the compressor system and to control the compressor speed. A second control board with a temperature sensor and a regulator controlled by a user send signals to the first control board's temperature inputs thereby setting a desired or requested temperature. A wireless communication system can be used to send signals between the first control board and the second control board. A third control board can be used to provide power and speed control to the blower fan.

In still a further general aspect, an air conditioning system includes a housing having an internal volume divided by a plate, an evaporator and compressor mounted above the plate and a condenser system and an expansion system mounted below the plate. A refrigerant flows in a closed loop from the evaporator, to the compressor, to the condenser, to the expansion system and then back to the evaporator.

Embodiments may include any of the above or following features. For example, the plate may have an insulating element.

The compressor, condenser and evaporator may be mounted to the plate. In another embodiment, the housing has a top wall and the evaporator is mounted to the top wall. The housing may also have bottom and side walls.

BRIEF DESCRIPTION OF THE SEVERAL VIEWS OF THE DRAWINGS

The drawings are meant to illustrate certain principles of the invention and do not limit its scope. The features, objects and elements are described in the specification with reference numerals that denote like elements in the drawings in which.

DETAILED DESCRIPTION OF THE INVENTION

Figure 1:
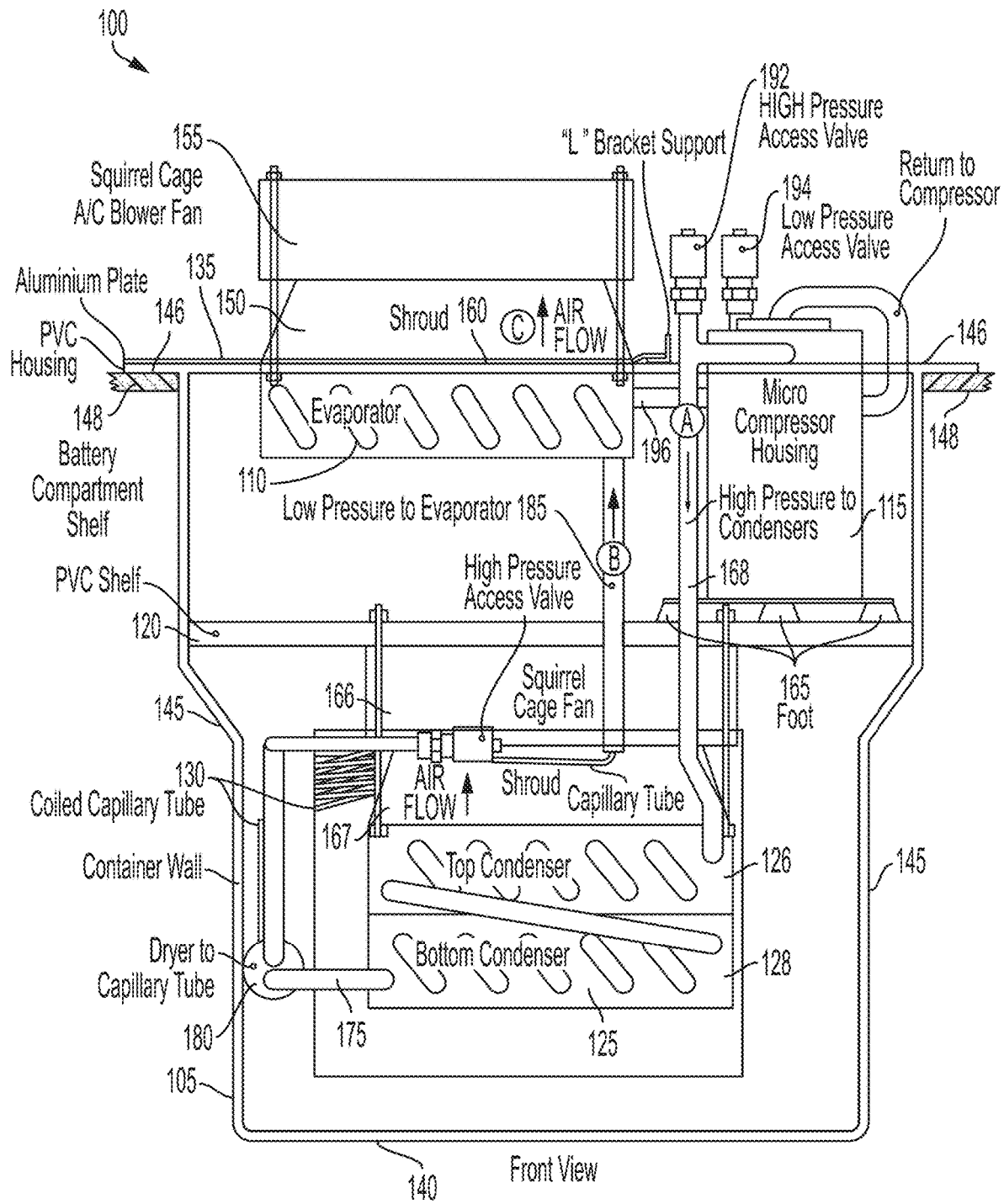
FIG. 1 is a front view of the air conditioner system.
Figure 2:
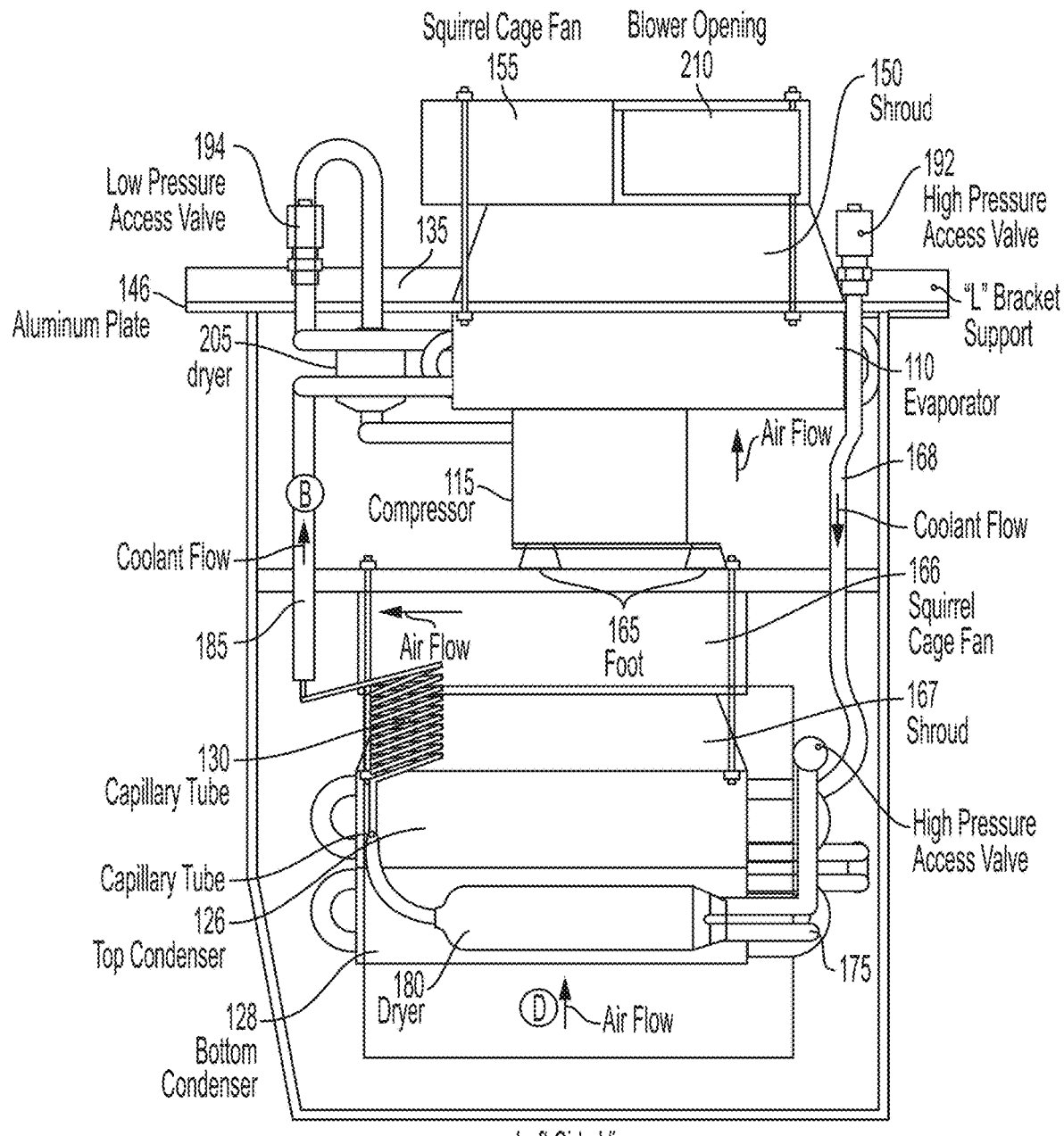
FIG. 2 is a left side view of the air conditioner system.
Figure 3:
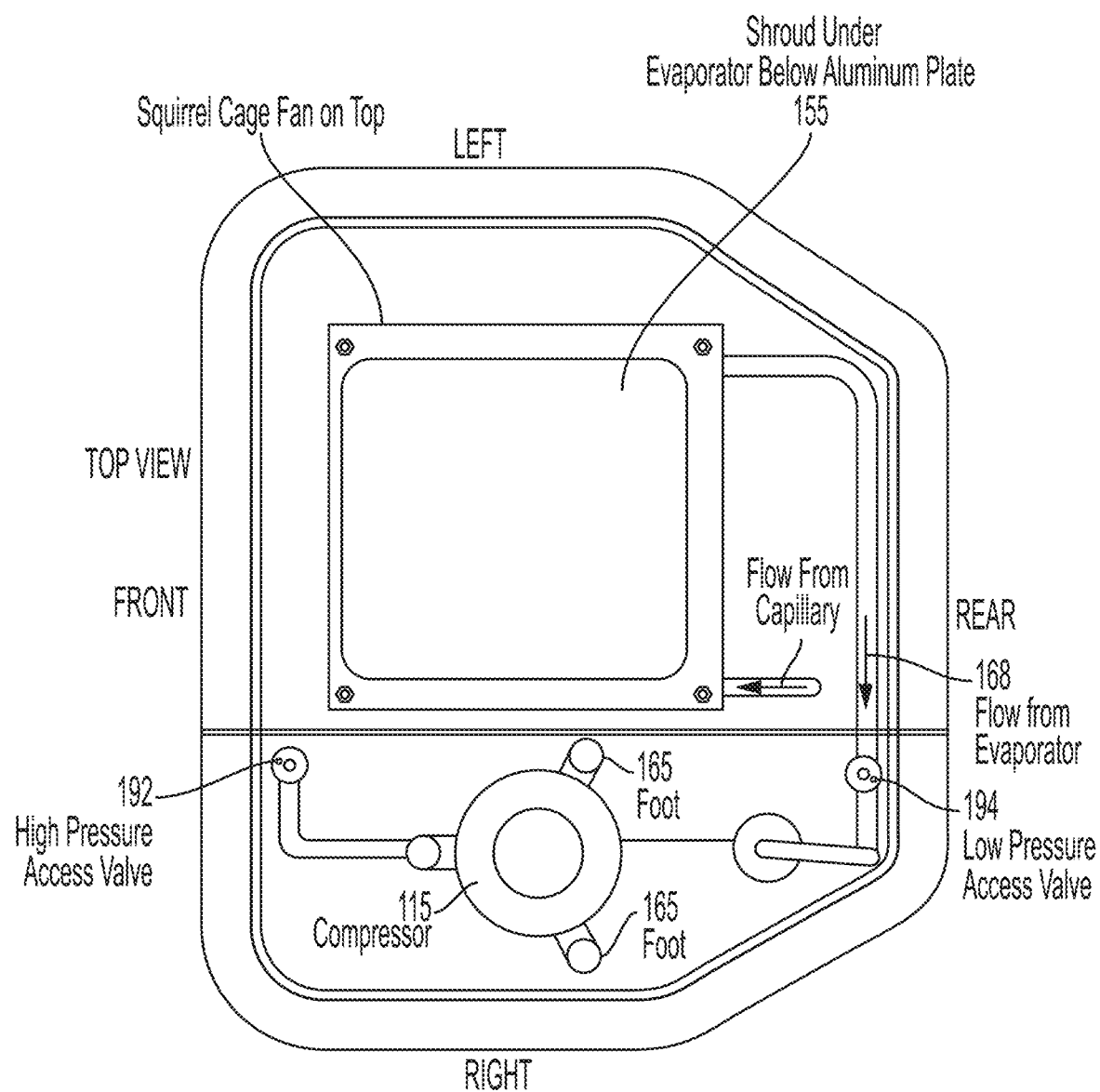
FIG. 3 is a top view of the air conditioner system.

FIGS. 1-3 illustrate front, left side and top views, respectively, of the air conditioning system 100 described herein. The system 100 has a compact design to fit behind the driver or passenger seat for installation in an empty battery bay. The dimensions of the unit fit in a housing 105 on a tray that measures 380 mm by 290 mm with the unit extending upwardly to a height of about 250 mm. The housing 105 may be, for example, a Moss battery box insert, 1962-74.5, group 21/26 HDPE.

The air-conditioning system 100 includes the elongated rectangular housing 105 or container 105 with an evaporator 110 and a compressor 115 mounted above a mid-frame 120 and a condenser 125 and an expansion valve (capillary tube) 130 mounted below the mid-frame (mounting frame) 120. The major components are mounted to the top of the housing 105 or to the mid-frame 120 or in a vertically stacked configuration.

The evaporator 110 may be, for example, a Purswave CP2X6X120 mini condenser/evaporator. The compressor 115 may be, for example, an Aspen Q-Series compressor and brushless motor drive model: Q9 low noise, miniature, rotary BLDC refrigeration compressor or a Purswave ST19DC tiny compressor R134a.

The housing 105 includes top and bottom walls 135, 140 and generally vertical side walls 145 divided or bisected by the mid-frame 120. The top wall 135 has a lip 146 that rests on the battery bay shelf 148. The evaporator 110 is mounted to the bottom of the top wall 135 with an evaporator shroud 150 and then an evaporator fan 155 positioned above the top wall 135. The evaporator fan may be, for example, a UTUO brushless radial blower dual ball bearing high speed 12V DC centrifugal fan.

The evaporator 110 and the evaporator fan 155 are bolted together to the top wall with the evaporator shroud 150 sandwiched between these components. A portion of the top wall 135 has a cut-out 160 to allow air flow between the evaporator 110 and the evaporator fan 160.

The compressor 115 is mounted on compressor feet 165 to the top of the mid-frame 120. A portion of the top of the compressor 115 may extend through the top wall 135. In other embodiments, the components are contained within the housing 105.

The condenser 125 is mounted to the underside of the mid-frame 120 with a condenser fan 166 and a condenser shroud 167 sandwiched between the condenser 125 and the mid-frame 120. In one embodiment the radiating surface area of the condenser 125 is twice the surface area of the evaporator 110. In another embodiment, a tope condenser 126 and a bottom condenser 128 can be coupled together with to increase the radiating surface area. In still another embodiment, the condenser 125 is essentially suspended in space to increase the surface area in contact with air flow and to prevent conduction through the mid-frame 120.

The mid-frame 120 essentially separates the top cooling portion of the air conditioner from the bottom heat dissipation portion of the air conditioner. The mid-frame 120 may be made of a thick plastic or may be covered with an insulating material to prevent heat from migrating into the cooling area.

In operation, the refrigerant exits the compressor 115 (see Arrow A) at a relatively high pressure and passes or is pushed through tubing to the condenser 125. The concentrated heat from the compressed refrigerant is circulated through the condenser's 125 pipes with fins and air is forced through the fins by the condenser fan 166 to dissipate heat. The bottom of the sports car may be fitted with vents to draw in fresh air and to dissipate collected heat (not shown).

The lower end of the condenser 125 has a refrigerant output line 175 that is coupled to a drier 180 and then to a capillary tube 130. The output line and the various tubes and lines described herein may be, for example, ¼" outer diameter copper ACR tubes. The drier 180 can adsorb system contaminants, such as water, and can provide physical filtration. The capillary tube 130 is copper tubing with a very small internal diameter. It is long in length, so it is coiled to several turns to occupy less space. The drier 180 may be, for example, a capillary tube 619 copper service filter drier. The capillary tube may have a 1.8 mm outer diameter.

When the refrigerant exits the capillary tube 130 its pressure drops due to the very small diameter of the capillary. The refrigerant changes from a high-pressure liquid to a much colder low-pressure state which flows though low pressure tube 185 into the evaporator 110 as shown by Arrow B. Air flows through the evaporator and is drawn through the evaporator shroud 150 by the evaporator fan 155 as shown by Arrow C. The cool air is pushed into the vehicle passenger compartment through ductwork (not shown) to remove heat from and provide cool air to the vehicle passenger compartment. The refrigerant exits the evaporator 110 through line 196 into the compressor 115 and the cycle continues.

The compressor has high pressure and low pressure access valves 192, 194 are provided for maintenance.

Referring to FIG. 2, another dryer 205 can be installed in line 196 between the evaporator 110 and the compressor 115. A blower opening 210 is also shown adjacent to the evaporator fan 155.

Air flow through the condenser 125 is also shown by Arrow D.

Figure 4:
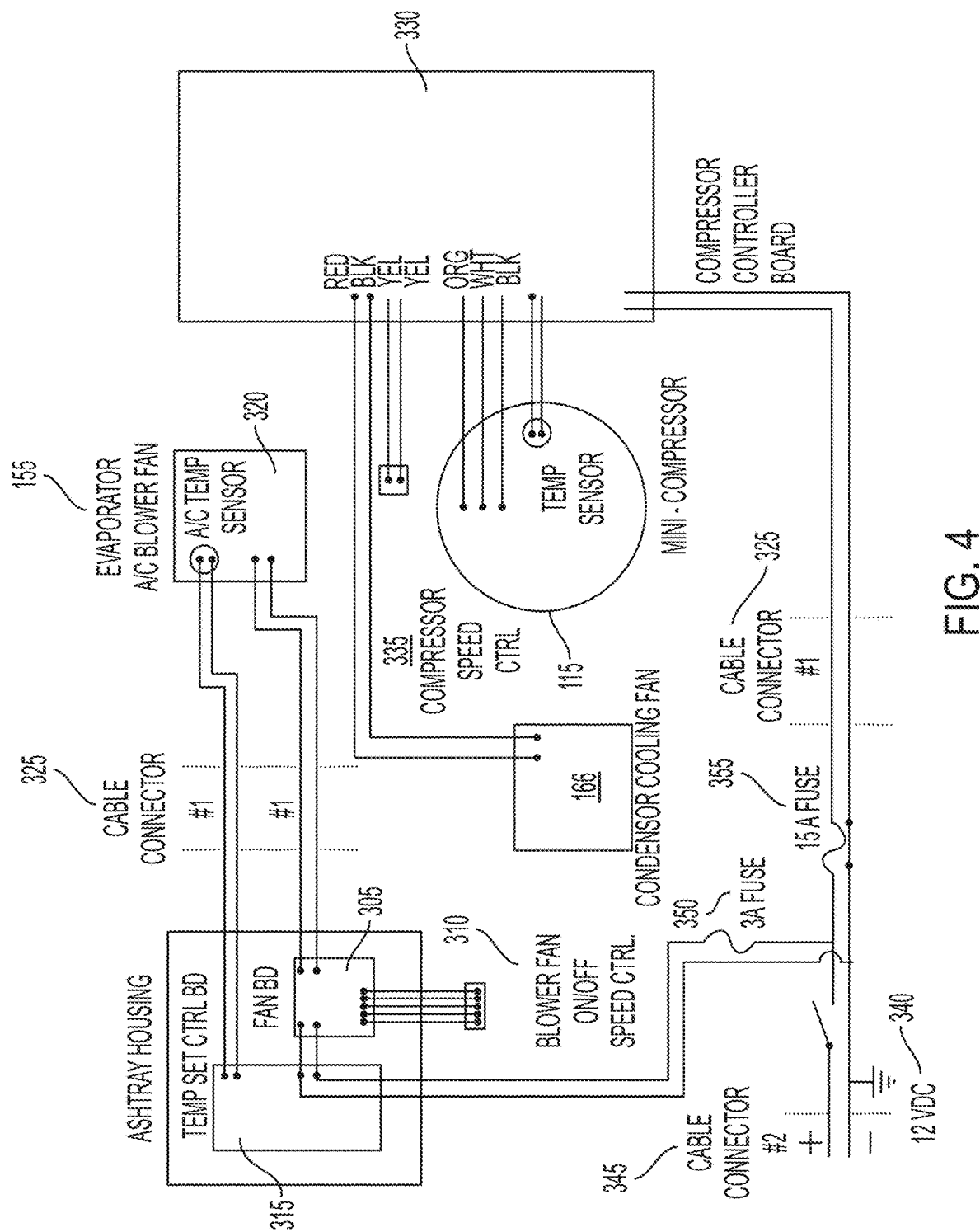
FIG. 4 is an electrical diagram of the air conditioner system.

FIG. 4 illustrates electrical circuitry that controls the system 100. An evaporator fan circuit board 305 is connected to the evaporator fan 155 to control the speed of the evaporator fan 155. The evaporator fan circuit board is connected to an on-off switch and speed control 310 that can be adjusted by the user. The speed control may be, for example, a uniquegoods 1803BKW 12 v 2A DC motor speed controller (PWM) adjustable driver switch.

A temperature set control board 315 is also connected to the evaporator fan 155. The evaporator fan 155 has a temperature sensor 320 which provides feedback to the temperature set control board 315 and give the user control of the temperature in the vehicle passenger compartment. The temperature set control board 315 and the evaporator fan circuit board 305 are connected to the to the evaporator fan 155 by cable connector #1 325. The temperature may be controlled and displayed with a Noyito digital temperature controller module −58° F. to +257° F. temperature control switch ntc waterproof sensor probe—blue LED display temperature control system (12V).

A compressor control board 330 is connected to the compressor 115, the condenser cooling fan 166 and a compressor speed control 335.

The circuitry is powered by the vehicle's 12 volt direct current power 340 by way of cable connector #2 345. A 3 amp fuse 350 protects the evaporator fan control board 305 and a 15 amp fuse 355 protects the compressor control board 330. Cable connector #1 325 connects the compressor control board 330 to the vehicle power system 340.

In operation the user turns on the air condition system power by closing the switch to the vehicle's power. The user then adjusts the temperature using buttons on the temperature set control board 315. The temperature is measured by the temperature sensor mounted at the evaporator blower fan 155. The evaporator blower fan 155 is turned on using the blower fan speed control 310.

The system is turned off by opening the switch to vehicle power. Upon restarting system, the temperature previously set will appear, and may be adjusted using the button controls on the temperature set control board 315.

The mini-compressor 115 which is controlled by the compressor controller board 330 will periodically stop when the requested temperature is reached and will automatically restart when the temperature called is 2 degrees higher. The blower fan 155 continues to operate when the compressor controller board 330 is cycling the compressor 115.

The installation of the above embodiment is intended to be a "drop-in." The housing 105 is designed to fit in a spare battery box or other compartment in the vehicle. A cable is run to the control boards which may be installed in the ashtray housing. Additional duct work may also be installed to provide cool air to the passenger compartment or to exhaust hot air out of the vehicle. For example, a duct may be installed from an opening in the bottom of the housing to a port leading out of the bottom of the passenger compartment or vehicle.

The present disclosure has been described with reference to the specific embodiments, however, those skilled in the art understand that various changes may be made and equivalents may be substituted without departing from the spirit and scope of the invention. In addition, many modifications may be made to adopt a particular situation, material, or component which falls within the spirit and scope of the present disclosure and the scope of the claims.

The invention claimed is:

1. An air conditioning system, comprising:
   a generally rectangular housing, the generally rectangular housing having a size of a 1962-74.5 Moss automobile battery box insert, with top and bottom walls and generally vertical side walls bisected by a mid-frame;
   an evaporator mounted to a bottom of the top wall;
   a compressor mounted to a top of the mid-frame adjacent to the evaporator on a same side of the mid-frame as the evaporator;
   a condenser mounted to a bottom of the mid-frame; and
   an expansion system mounted at a position below the bottom of the mid-frame;
   wherein a refrigerant flows through tubing in a closed loop from the evaporator to the compressor, the refrigerant flows from the compressor to the condenser, the refrigerant then flows from the condenser to the expansion system, and the refrigerant flows from the expansion system to the evaporator.

2. The air conditioning system of claim 1, wherein the expansion system comprises a capillary tube.

3. An air conditioning system, comprising:
a rectangular housing, the rectangular housing having a size of a 1962-74.5 Moss automobile battery box insert, with top and bottom walls and vertical side walls bisected by a mid-frame;
an evaporator and compressor mounted above the mid-frame, the compressor being mounted adjacent to the evaporator on a same side of the mid-frame as the evaporator; and
a condenser and an expansion system mounted below the mid-frame;
wherein a refrigerant flows in a closed loop from the evaporator, to the compressor, to the condenser, to the expansion system and then back to the evaporator.

4. The air conditioning system of claim 3, wherein the expansion system comprises a capillary tube.

5. The air conditioning system of claim 3, further comprising a first fan to circulate air through the evaporator.

6. The air conditioning system of claim 3, further comprising a second fan to circulate air through the condenser.

7. The air conditioning system of claim 3, further comprising a compressor control board to provide power to the compressor, regulate the temperature inputs cycling the compressor system, and to control the compressor speed.

8. The air conditioning system of claim 7, further comprising a temperature set control board having a temperature sensor and a regulator controlled by a user to send signals to the compressor control board's temperature inputs thereby setting a desired or requested temperature.

9. The air conditioning system of claim 8, further comprising an evaporator fan control board to provide power and speed control to a blower fan.

10. The air conditioning system of claim 3, wherein the vertical side walls of the housing are tapered such that an internal area enclosed by the housing above the mid-frame is greater than an internal area enclosed by the housing below the mid-frame.

11. An air conditioning system, comprising:
a housing, the housing having a size of a 1962-74.5 Moss automobile battery box insert, the housing having an internal volume divided by a plate;
an evaporator and compressor mounted above the plate, the compressor being mounted adjacent to the evaporator on a same side of the plate as the evaporator; and
a condenser and an expansion system mounted below the plate;
wherein a refrigerant flows in a closed loop from the evaporator, to the compressor, to the condenser, to the expansion system and then back to the evaporator.

12. The air conditioning system of claim 11, wherein the compressor is mounted to the plate.

13. The air conditioning system of claim 11, wherein the condenser is mounted to the plate.

14. The air conditioning system of claim 11, wherein the housing comprises a housing with top, bottom walls and side walls.

15. The air conditioning system of claim 14, wherein the evaporator is mounted to the top wall.

* * * * *